United States Patent [19]

Kienholz

[11] 4,455,814
[45] Jun. 26, 1984

[54] SEED HARVESTER

[75] Inventor: John C. Kienholz, Edmonton, Canada

[73] Assignee: Her Majesty The Queen in right of Alberta as Represented by The Minister of Agriculture, Edmonton, Canada

[21] Appl. No.: 340,322

[22] Filed: Jan. 18, 1982

[51] Int. Cl.³ .................... A01D 45/30; B01D 45/16
[52] U.S. Cl. ........................................ 56/126; 56/130; 130/30 J; 55/319; 55/413; 55/470; 55/385 R
[58] Field of Search .................. 56/126–130, 56/12.8, 13.1, 13.4, 14.4, 16.5, 16.6, 330, 328 R, 220, 221, 226, DIG. 8; 130/30 R, 30 B, 30 J, 27 H, 27 M, 27 T; 55/319, 395, 399, 442, 461, 467, 470, 385 R

[56] References Cited

U.S. PATENT DOCUMENTS

| | | | |
|---|---|---|---|
| 383,796 | 5/1888 | Burfeind | 56/130 |
| 714,381 | 11/1902 | Koelkebeck | 55/398 |
| 1,131,086 | 3/1915 | Richardson | 130/27 H |
| 2,046,932 | 7/1936 | Wyatt et al. | 56/16.5 |
| 2,460,029 | 1/1949 | Ramp | 56/16.5 |
| 2,499,047 | 2/1950 | Wilkins | 56/126 |
| 3,509,699 | 5/1970 | Calder | 56/14.4 |
| 4,348,057 | 9/1982 | Parenti et al. | 55/344 |

FOREIGN PATENT DOCUMENTS

| | | | |
|---|---|---|---|
| 931550 | of 1955 | Fed. Rep. of Germany | 56/126 |
| 2063634 | 7/1971 | Fed. Rep. of Germany | 55/461 |
| 809616 | 2/1959 | United Kingdom | 56/126 |

OTHER PUBLICATIONS

Transaction of the A.S.A.E., 1979, p. 270.

*Primary Examiner*—Gene Mancene
*Assistant Examiner*—John G. Weiss
*Attorney, Agent, or Firm*—Max L. Wymore

[57] ABSTRACT

A seed harvester is provided for harvesting seeds from a standing crop without cutting the crop. The harvester is particularly designed for harvesting grass seed. The harvester includes a header assembly for stripping from the crop, and a seed separator for drawing the seeds from the header assembly in an air stream and for separating the seeds from the air stream. The header assembly includes a frame assembly having a transverse inlet which communicates with the seed separator. An endless revolving stripping surface is mounted across this transverse opening to contact the seed heads of the crop and strip the mature seeds from the crop. A rotating reel is mounted to rotate parallel to, and above and forwardly of, the seed stripping surface. On rotation, the reel guides the crop into contact with the seed stripping surface and holds it there for a time to permit the seed stripping surface to remove mature seeds from the crop. The seed separator includes a duct, curved between its ends. The duct inlet communicates with the transverse inlet of the header assembly. A blower is provided at the duct outlet to draw seeds in an air stream, from the header assembly and through the duct. Baffles are provided across the curved duct section which, together with the curve in the duct, cause the seeds to move outwardly toward the outer wall of the curved duct section. This achieves partial separation of the seeds from the air stream. To achieve the remainder of the separation, the seed separator includes a seed withdrawal duct in the outer wall of the curved duct section, and a sealed container at the end of the seed withdrawal duct. Air is drawn through the container and the seed withdrawal duct, preferably by the blower, to carry the seeds in an air stream into the container.

4 Claims, 9 Drawing Figures

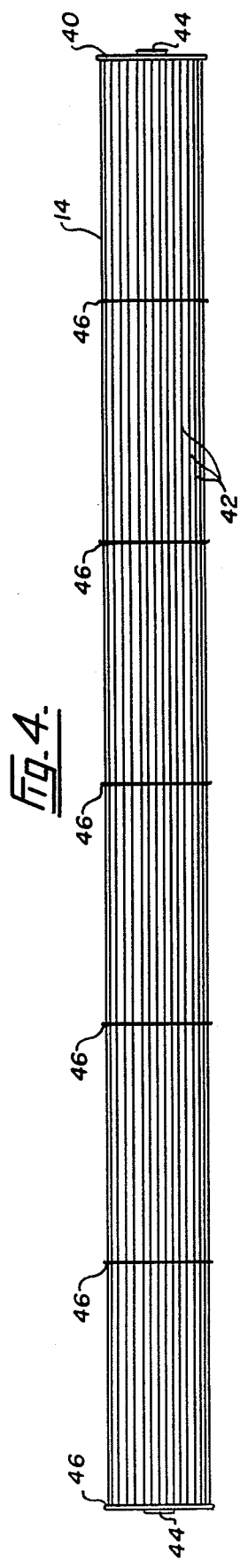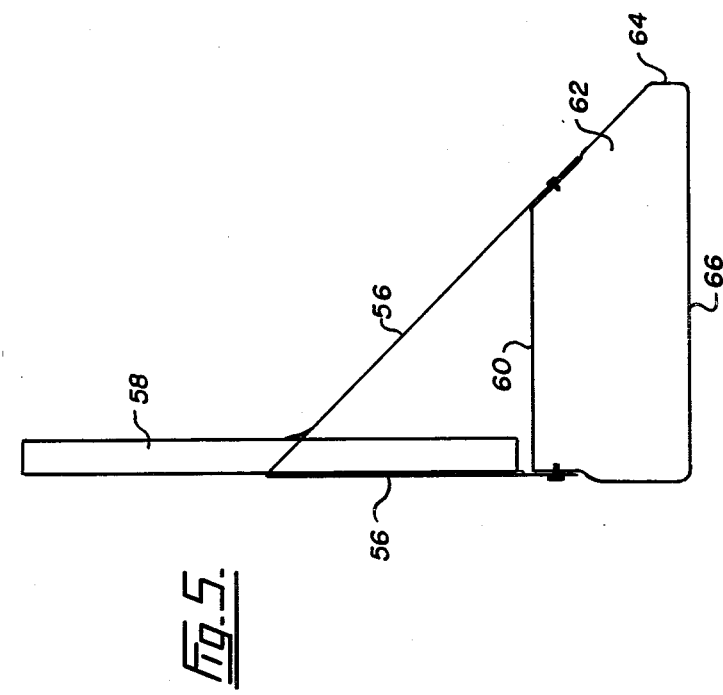

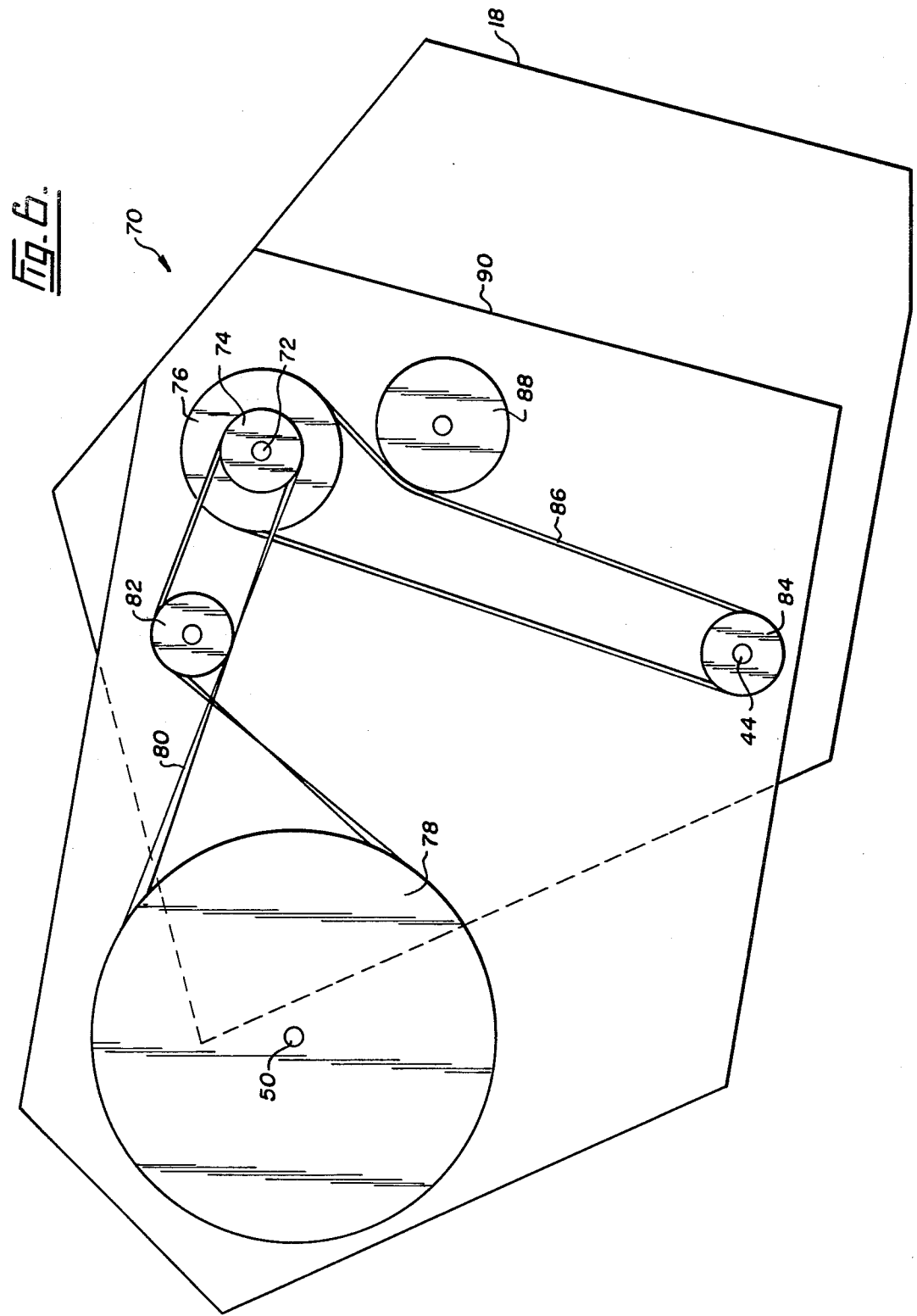

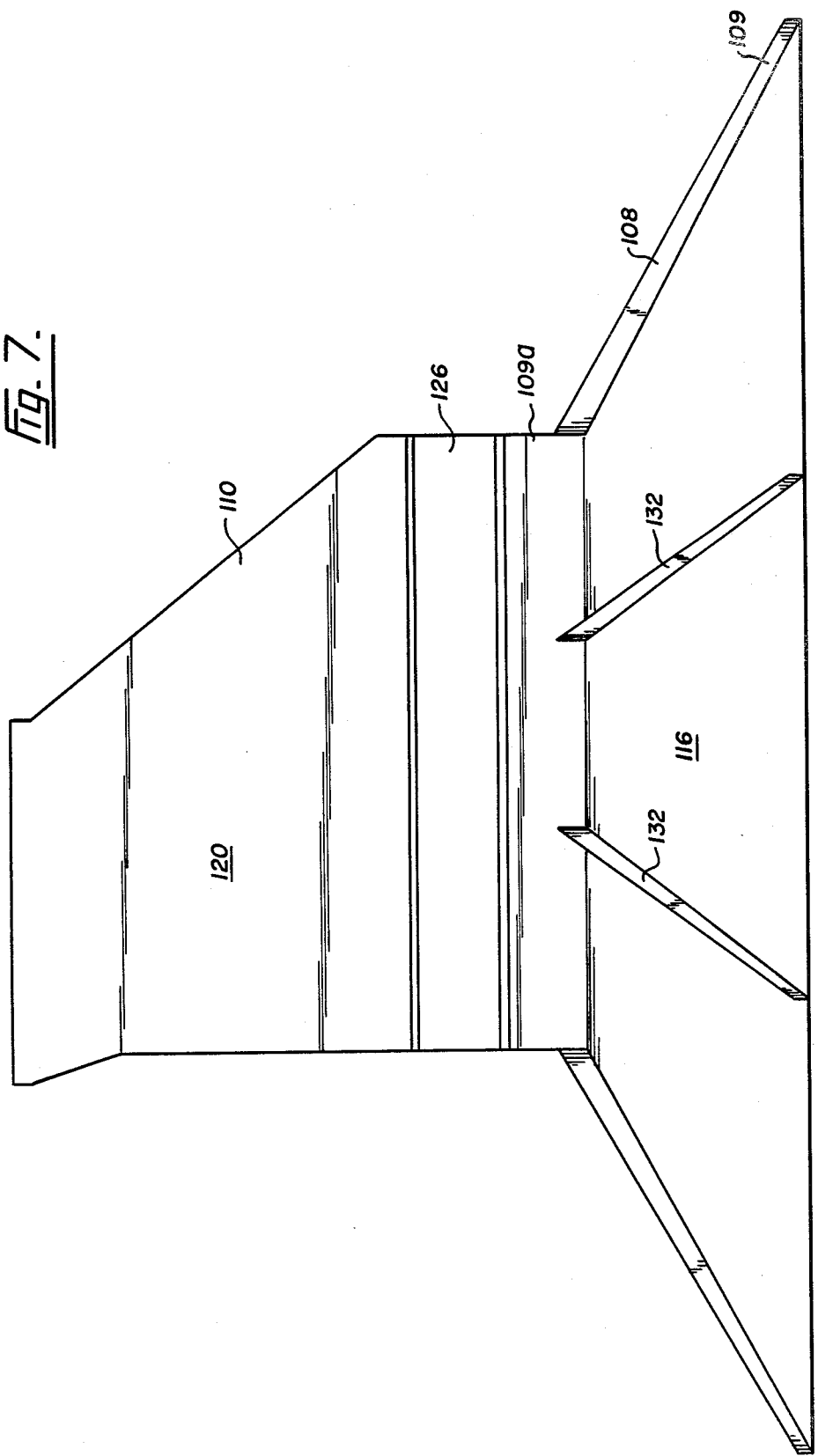

SEED HARVESTER

BACKGROUND OF THE INVENTION

The present invention relates to a method and apparatus for removing seeds from a standing crop without cutting the crop. The invention also relates to an apparatus for separating seeds from an air stream.

It is often desirable to harvest seeds from many varieties of plants, for example grasses, for the purposes of repropagation. In particular it is desirable to harvest seeds from such grasses as common meadow foxtail, Garrisons Creeping Foxtail, broom, crested wheat and timothy.

Many varieties of grass seed are difficult to harvest. Such factors as small seed size, light weight of the seeds, the presence of chaff material associated with the seeds, loose attachment of the seed to the plant, variable seed head height, varying rates of seed maturation, and weeds in the grass crop, all contribute to the problems in harvesting grass seed.

Conventional swathing and combining equipment designed to cut, swath, thresh and clean cereal grain crops have been used to harvest grass seed. However, the grass seed is not successfully harvested by this equipment. If such conventional equipment is used, a harvest of about 50% grass seed and 50% chaff, stem, leaf, and weed material is recovered. This mixture is very difficult, if not impossible, to clean or plant, mainly due to its poor flow characteristics.

Furthermore, the conventional swathing and combining equipment cannot selectively recover the mature seeds from the grass plant, since the entire crop must be cut at one time. Only the seeds which are mature at that time are useful. A considerable amount of the mature grass seed is lost in this harvesting procedure, both from shattering of the seed heads by the wind, from impacting of the seed head by the swather reel's bats, and by falling out of the swath left to dry in the field. Also, the late-maturing seeds are effectively lost.

To overcome some of these problems, seed harvesters have been designed to harvest grass seed from the standing crop without cutting the crop. One prior art device of this type was developed by R. W. Whitney, R. M. Ahring and C. M. Taliaferro and is described in Transactions of the ASAE, 1979, page 270. The device is essentially a modification of a grain swather unit, from which the cutting bar has been removed. The device includes a generally horizontal platform which is moved through the crop just below the height of the seed heads. A rotating reel above the platform is used to bend the plant rearwardly over the platform. A plurality of flexible flails are fixed to the reel. A stationary concave plate is mounted horizontally on the platform. On rotation of the reel the seed heads are trapped between the flails and the concave plate to strip the seeds from the plant. The seeds are pulled by suction into a screen-type air-seed separator.

While this device may overcome some of the above-mentioned problems, it is believed to have its difficulties. By pulling the plant stem rearwardly over the forwardly advancing horizontal platform, a substantial amount of stem breakage can take place. The broken stems, together with the seed heads, are then harvested with the seeds. Further, it is believed that the rotating reel, in order to strip the seeds, must be rotated at a relatively high speed. The reel would then cause significant seed dislodging as the reel flails impacted the seed heads ahead of the horizontal platform. Also, in running the reel at this high speed, considerable air turbulence would be generated, which in turn would scatter the seed.

Other seed harvesters have been described in the patent literature for harvesting seeds from standing crops; see for example U.S. Pat. No. 2,460,029 issued to R. M. Ramp and U.S. Pat. No. 2,046,932 issued to F. Wyatt et al.

The Ramp device was designed specifically for the harvesting of dandelion seeds and is not believed to be suitable for the harvest of other seeds such as grass seeds. The device consists of two parallel brushes rotating in opposite directions, one brush being mounted above and ahead of the other, across an opening. Air is drawn through the opening. The brushes are arranged to whisk the seeds from the plant. The seeds are then pulled between the brushes into the opening. The seeds are separated from the air in a screen-type air-seed separator. It is believed that the rotating brushes trap dandelion fluff between the brush bristles and thereby whisk the seeds from the plant. Most seeds, especially grass seeds, cannot be dislodged from the plant by this action. It is believed that a more positive stripping action is necessary. Also, the upper brush in the Ramp device is shown to include a large diameter central hub, around which the brushes are fixed. In grass crops this hub would cause substantial undesirable bending and breakage of the stems and seeds heads.

The harvesting device of Wyatt et al was designed specifically to strip clover heads from standing clover plants. The clover head is pinched off as the bats of a rotating reel contact a stationary flexible strip. The clover head is pulled by an air stream into a combined screen and cyclone type separator. This device is not able to strip the clover seed directly from the clover plant. The device therefore includes a cylinder-concave arrangement to thresh the seeds from the harvested clover heads.

With respect to the air-seed separating devices, screen-type and cyclone-type separators have been used in seed harvesters. The screen-type separators often become clogged as the seeds, and any stem or chaff material, blind the screen surface. The cyclone-type separators usually need to be quite large to effect seed-air separation. The separator is then heavy, cumbersome and costly to carry around the field.

In summary, there is a need for a seed harvester having the following desirable capabilities:

(1) the ability to strip seeds from a standing crop without cutting the crop;

(2) the ability to preferentially strip mature seeds from a standing crop, leaving the immature seeds on the plant for subsequent maturing and harvesting;

(3) the ability to strip seeds from a standing crop without causing substantial stem breakage by bending of the stems or seed loss from impacting of the seed heads; and (4) provision for seed-air separation in a compact arrangement which can be economically carried around the field.

SUMMARY OF THE INVENTION

The present invention provides a seed harvester having a header assembly, for removing seeds from a standing crop, and a seed separator for drawing the seeds from the header assembly in an air stream and for separating the seeds from the air stream. The seed harvester is believed to overcome at least some of the above-described problems. While the harvester has been designed specifically for harvesting grass seeds, it should find application in the harvesting of other crops.

The header assembly includes a frame assembly adapted for forward movement through the standing crop, means, carried by the frame assembly, for stripping seeds from the standing crop, and means, carried by the frame assembly, for holding the seed bearing portion of the crop against the seed stripping means. More particularly, the frame assembly forms a forwardly facing transverse inlet leading into the seed separator. The seed stripping means, which comprises an endless revolving surface carrying stripping edges, is mounted to rotate at the transverse inlet so as to contact the seed heads of the crop. The stripped seeds are drawn in an air stream from the seed stripping surface, through the transverse inlet, and into the seed separator.

In a preferred form, the seed stripping means comprises a cylindrical drum mounted transversely in front of the transverse inlet for rotation about its longitudinal axis. The drum has a support frame of spaced vertical discs. A plurality of cylindrically arranged, horizontally extending, spaced wires extend between the discs. The spaced wires provide the stripping edges which, when rotated, actively strips mature seeds from the seed heads. The spaces between the wires allow the seeds to be pulled through the drum and into the seed separator. The drum is rotated in an upward direction at its front.

The means for holding the crop against the seed stripping means, in a preferred form, comprises a cylindrical reel carried by the frame assembly, above and forwardly of the seed stripping means. The reel is mounted to rotate about its longitudinal axis parallel to the seed stripping means, in a direction opposite to the seed stripping means. The holding means further comprises a plurality of batts fixed around the periphery of the reel. Each batt has a cushioned working surface which is arranged to substantially tangentially engage stripping edges of the stripper to compress at least part of the working surface against said stripping edges. The bats are fixed to the reel so as to leave substantial openings between the bats, which openings extend inwardly toward the reel axis. When the reel is rotated, a segment of the crop is trapped between sequential batts and is guided into contact with the seed stripping means. The seed heads of the crop are momentarily pressed against the seed stripping means by the batts as the latter are rotated over the surface of the seed stripping means. This allows the rotating seed stripping edges to actively strip the seeds from the seed heads.

In another preferred aspect of the header assembly, the cylindrical reel of the holding means has a larger diameter than the cylindrical drum of the seed stripping means. This large diameter reel accommodates the range of seed head heights of the crop. Also, the cylindrical stripping drum is rotated at a faster speed than is the cylindrical reel.

The seed separator of the present invention includes a duct having an inlet end and an outlet end. A first pneumatic means, such as a blower, is mounted at the outlet end for drawing an air stream carrying seeds through the inlet end. When used with the above-described header assembly, the inlet end of the separator communicates with the transverse inlet formed in the header assembly. Seeds stripped by the header assembly are therefore pulled into the duct. The duct is curved between its ends to form a curved duct section. The curve is sufficient to cause the seeds to be thrown outwardly, by centrifugal force, toward the outer wall of the duct. Means, preferably a plurality of spaced baffles, are fixed transversely within the curved duct section to divide that duct section into a seed chamber adjacent the outer wall of the duct and an air chamber adjacent the inner wall of the duct. The means are arranged so as to deflect the seeds impinging thereon outwardly toward the outer wall while allowing air to pass from the seed chamber to the air chamber toward the outlet end of the duct. A seed withdrawal duct is provided at the outer wall of the curved duct section communicating with the seed chamber to withdraw the seeds from the seed chamber. A sealed container is connected to the seed withdrawal duct to collect the seeds. Means, such as a second blower or a tube connected to the first blower, is connected to the container to draw air through the container and the seed withdrawal duct. This air stream thereby carries the seeds from the curved duct section into the container. The container is large in size, to allow the seeds to fall out by gravity from the air stream.

The seed separator as above-described, accomplishes air-seed separation in two steps. A portion of the separation takes place in the curved duct section, while the remainder of the separation takes place in the container.

In a more preferred embodiment of the seed separator, the baffles in the curved duct section are arranged on a curve generally following the curve of the curved duct sections. The baffles are also preferably arranged so as to decrease the cross-sectional area of the seed chamber near the seed withdrawal duct. These provisions aid in concentrating the seeds in the air stream as they approach the seed withdrawal duct.

While the header assembly and seed separator of the present invention are preferably used together as a complete seed harvester machine, each may be used separately with an alternate form of a header assembly or a seed separator. For instance, the header assembly of the present invention may be used with a conventional screen-type, cyclone-type or impingement-type seed-air separator.

Broadly stated, the invention is a header assembly for removing seeds from the seed heads of a standing crop, comprising: a frame assembly; an endless seed stripping means mounted in the frame assembly and adapted to be rotated in a clockwise direction at a relatively high rate of speed about a substantially horizontal axis, said stripping means comprising circumferentially spaced apart stripping edges extending thereacross; an endless reel mounted in the frame assembly above the stripping means and adapted to be rotated in a counterclockwise direction about a substantially horizontal axis at a relatively low rate of speed, said reel having circumferentially spaced apart batts on its periphery which batts extend across the reel and form openings therebetween which extend inwardly toward the axis of the reel, whereby, when the reel is rotated, a segment of crop is trapped between sequential batts and is deflected into contact with the stripping means; each said batt having a cushioned working surface arranged to momentarily substantially tangentially contact and compress against one or more stripping edges of the stripping means in the course of a rotation about the axis of the reel, to thereby positively hold seed heads against said edges to permit seeds to be stripped therefrom.

The invention also provides a new method of removing seeds from a standing crop. The method comprises the steps of: advancing a revolving surface through the standing crop, the revolving surface being positioned to engage the seed bearing portion of the crop, the revolving surface moving in an upward direction at its front; holding the seed bearing portion of the crop against the revolving surface for a brief time to permit the surface to strip seeds from the crop, without substantial impacting of the seeds and without substantial stem breakage; and drawing air from the revolving surface to gather the stripped seeds.

In another broad aspect, the invention provides a seed separator for separating seeds from an air stream carrying seeds. The seed separator comprises: a duct having an inlet end and an outlet end; first pneumatic means at the outlet end for drawing the air stream carrying seeds into the inlet end and through the duct; the duct being curved between the inlet and outlet ends to form a curved duct section defined by an inner and an outer wall and two side walls, the curve being sufficient to cause the seeds in the air stream to be thrown by centrifugal force outwardly toward the outer wall; means extending transversely across the curved duct section between the side walls and dividing the curved duct section into a seed chamber adjacent the outer wall and an air chamber adjacent the inner wall, the means being arranged so as to deflect seeds impinging thereon outwardly toward the outer wall, while allowing air to pass from the seed chamber to the air chamber toward the outlet end of the duct; a seed withdrawal duct communicating with the seed chamber for withdrawing seeds from the seed chamber of the curved duct section; sealed container means connected to the seed withdrawal duct for collecting the seeds; second pneumatic means connected to the container means for drawing an air stream through the container means and the seed withdrawal duct to thereby carry the seeds into the container means; and the container means being of a sufficient size to allow the seeds to fall out of the air stream carrying them, whereby a portion of the seed-air separation operation takes place in the curved duct section while the remaining seed-air separation operation takes place in the container means.

DESCRIPTION OF THE DRAWINGS

FIG. 4 is a front view of the seed stripping drum removed from the seed harvester.

FIG. 5 is a side sectional view of a bat from the rotating reel arrangement.

FIG. 6 is a side view of the drive means for rotating the reel arrangement and the seed stripping drum at differential speeds.

FIG. 7 is a top plan view of the hinged duct section of the seed separator leading from the header assembly. The top sheet of the duct is removed to show the seed and air directing baffles.

DESCRIPTION OF THE PREFERRED EMBODIMENT

Figure 1:
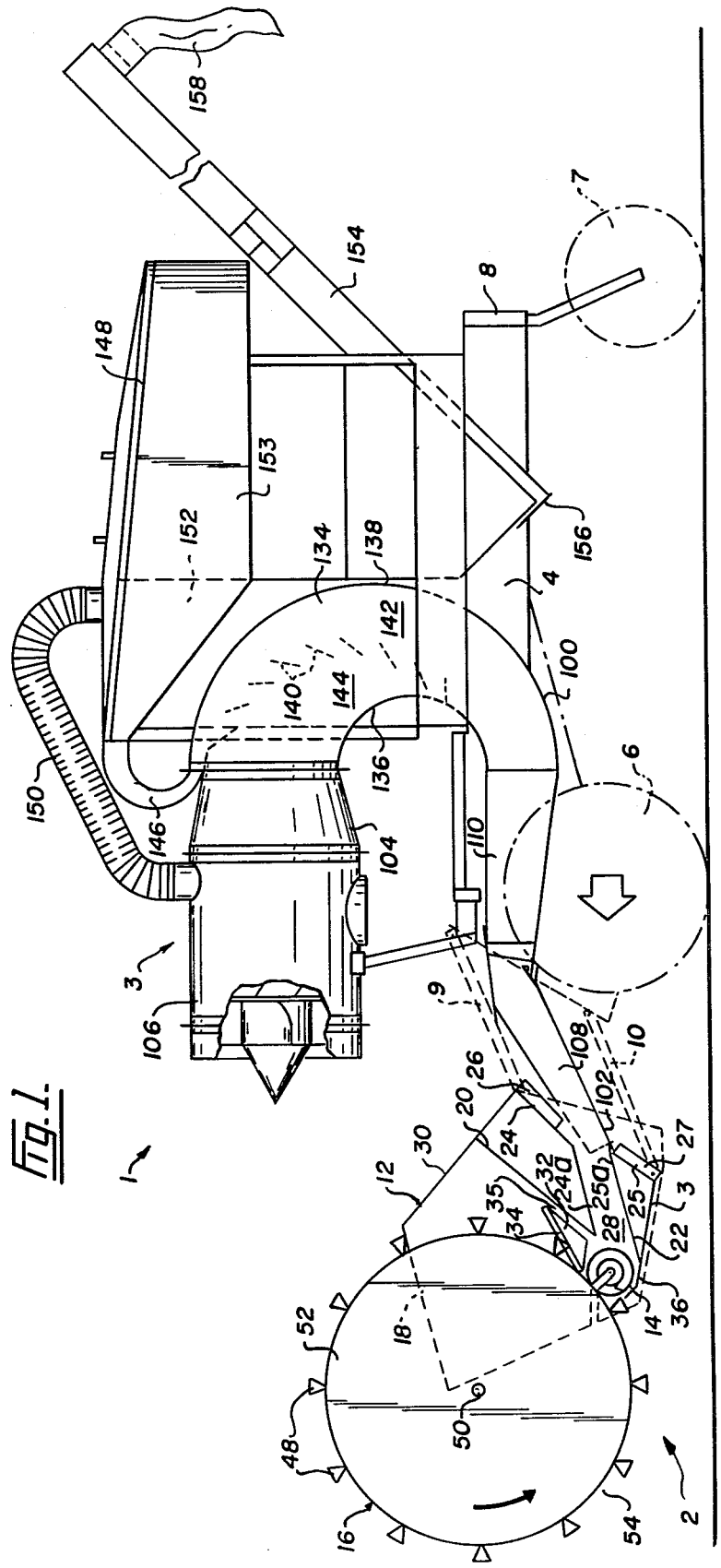
FIG. 1 is a schematic side sectional view of the seed harvester to illustrate the header assembly and the seed separator.
Figure 2:
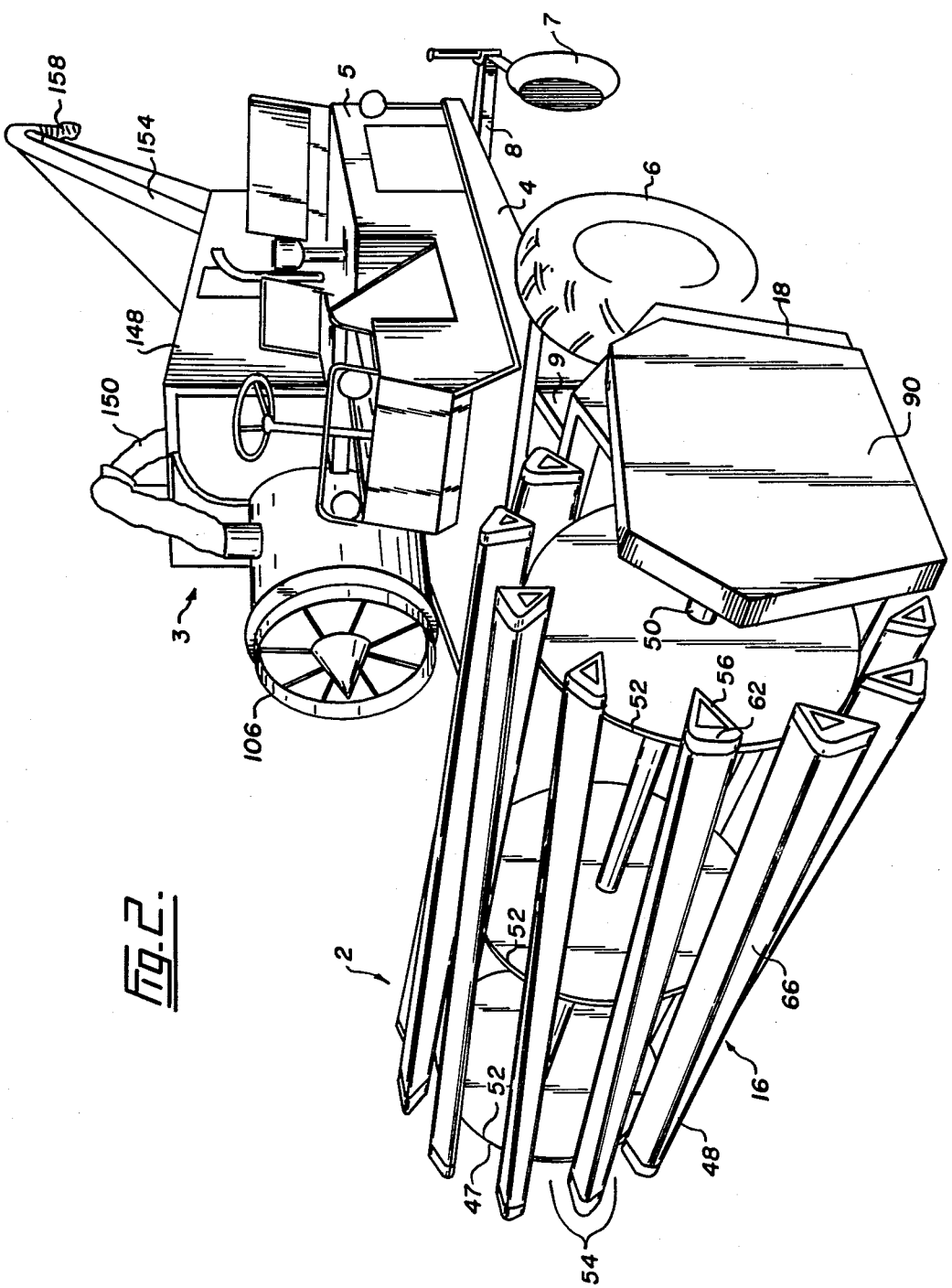
FIG. 2 is a front perspective view of the seed harvester illustrating the rotating reel arrangement of the header assembly.

With reference to the drawings, the seed harvester 1 includes a header assembly 2 for removing seeds from a standing crop and a seed separator 3 for drawing the stripped seeds from the header assembly 2 in an air stream, for separating the seeds from the air stream, and for collecting the separated seeds. As seen in FIGS. 1 and 2, both the header assembly 2 and the seed separator 3 are mounted on a conventional grain swather power unit 4 for movement through the standing crop. The swather unit 4 also provides the power necessary to drive components of harvester 1, as will be described hereinafter. Since the swather unit 4 is conventional in the art it will only be described briefly.

A swather unit having the engine 5 placed off to one side, as shown in FIG. 2, is preferred, as the seed separator 3 can more easily be accommodated alongside the engine. Most conventional swather units are provided with only three wheels. For the present invention the swather unit 4 was modified, for stability purposes, to include four wheels, two front steering wheels 6 and two rear castor wheels 7. The rear wheels 7 are attached to a walking bar assembly 8 for travel over rough terrain.

The swather unit 4 includes a pair of spaced forwardly extending upper lift arms 9. A pair of forwardly extending lower lift arms 10 is connected to the swather unit 4 parallel to and below the upper pair of lift arms 9. The lift arms 9, 10 can be simultaneously raised and lowered by a pair of hydraulic cylinders (not shown) mounted vertically below the upper lift arms 9. The header assembly 2 is pivotally attached to the front ends of the lift arms 9, 10. The header assembly 2 can therefore be raised and lowered to adjust the height at which it travels in the field. The height of the header assembly 2 can then be adjusted to accommodate varying crop heights.

THE HEADER ASSEMBLY

The basic components of the header assembly 2 include a frame assembly, generally indicated at 12, a seed stripping drum 14 for stripping seeds from the crop, and a rotating reel 16 for holding the seed bearing portion of the crop against the seed stripping drum 14 for a time to permit the seeds to be stripped from the crop.

Figure 3:
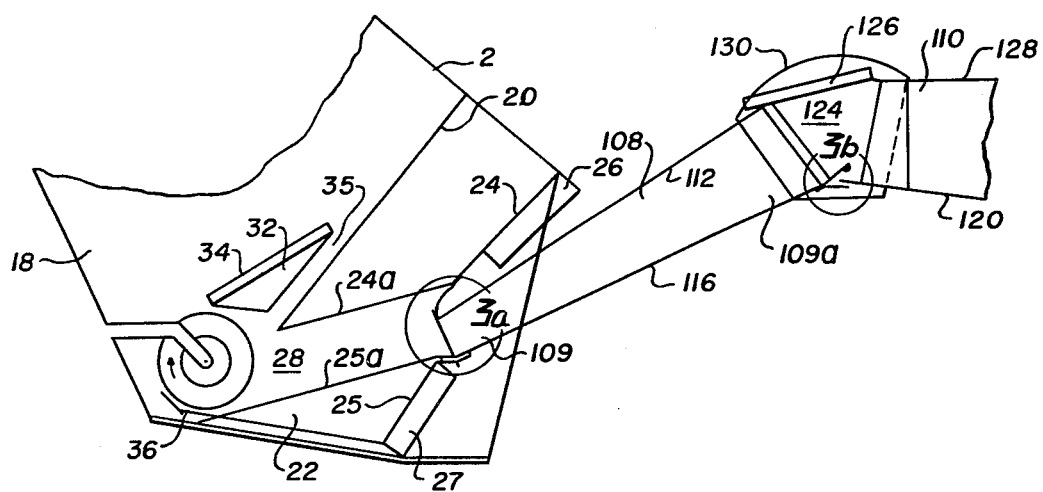
FIG. 3 is a fragmentary side sectional view of the header assembly showing the ducts of the seed separator leading to the seed stripping drum to gather seeds therefrom.

The frame assembly 12, as best seen in FIGS. 1, 2 and 3, includes a pair of parallel spaced side plates 18. The side plates 18 are connected by an upper box section 20 and a lower box section 22, both of which extend transversely between the side plates 18. The upper box section 20 has the quadilateral shape shown in cross-section in FIGS. 1 and 3. The lower box section 22 has a triangular shape shown in cross-section in FIGS. 1 and 3. The rear faces 24, 25 of the box sections 20, 22 respectively are provided with two pairs of brackets 26 and 27 for connection to the upper and lower swather lift arms 9, 10.

The lower face 24a of the upper box section 20 is spaced from the upper face 25b of the lower box section so as to form a forwardly facing transverse inlet 28 therebetween. The inlet 28 leads rearwardly from the header assembly 2 into the seed separator 3, to be described later.

The frame assembly 12 also includes a top plate 30 extending transversely between the side plates 18 to close the top of the frame assembly 12. The front of the frame assembly is left substantially open to accommodate the seed stripping drum 14 and the rotating reel 16. The side plates 18, the box sections 20, 22 and the top plate 30 limit wind movement within the frame assembly 12.

The seed stripping drum 14 is mounted between the side plates 18 in front of the transverse inlet 28. Bearings (not shown) are provided in each side plate 18, to allow the drum 14 to rotate.

The rotating reel 16 is mounted between the side plates 18, again in bearings (not shown) on each side plate 18. The rotating reel 16 is spaced above and forwardly of the drum 14.

The frame assembly 12 includes a third box section 32 connected as shown in FIG. 1 between the side plates 18, above the seed stripping drum 14. The third box section 32 has the triangular shape shown in cross-section in FIG. 1. The forward face 34 of this box section 32 provides a surface above the seed stripping drum 14, against which seed heads can land should a portion of the crop be higher than the seed stripping drum 14. This box section 32 is spaced forwardly of the upper box section 20 such that a duct 35 is formed between the box sections 20 and 32. While the majority of the seeds stripped from the plant are drawn through the seed stripping drum 14 and into the inlet 28, any seeds flying up above the seed stripping drum 14 should drop down through the duct 35 to join the remainder of the stripped seeds at the inlet 28.

The frame assembly 12 also includes a floor section 36 extending between the side plates 18 and beneath the seed stripping drum 14. The floor section 36 prevents seeds from dropping from the drum 14 to the ground. Seeds landing on the floor section 36 are pulled rearwardly through the inlet 28 and into the seed separator 3.

As shown in FIG. 4 the seed stripping drum 14, in its most preferred embodiment, consists of a support frame 40 and a plurality of cylindrically arranged, horizontally spaced wires 42 attached to the frame 40. The frame 40 includes a central shaft 44 and a plurality of vertical circular discs 46 spaced therealong. The discs 46 have a plurality of holes (not shown) formed around their peripheries. The wires 42 are threaded through these holes and are fastened to the two discs at the ends of the frame 40. The spaces between the wires 42 allow seeds to be pulled through the drum 14 and into the inlet 28.

When rotated at relatively rapid speeds, the wires 42 of the seed stripping drum 14 provide an effective surface for actively stripping mature seeds from the standing crop. Other endless revolving surfaces might also be employed. Another type of perforated cylindrical drum, for example a revolving ribbed canvas belt, would provide a surface, not necessarily in a cylindrical shape, which could be used for seed stripping. If the revolving surface is not perforated, the seeds could be drawn from the top and bottom of, rather than through, the revolving surface. The term surface, as used herein, is meant to include both an intermittant surface such as that formed by the spaced wires and a continuous surface such as that formed by an endless belt.

The rotating reel 16 is shown in FIGS. 1 and 2 to include a support frame 47 and a plurality of bats 48 mounted on the frame 47. The frame 47 includes a central shaft 50 mounted to rotate between the side plates 18. The frame 47 also includes three large diameter discs 52 fixed along the length of the shaft 50. The bats 48 are fixed around the peripheries of the discs 52 across the width of the frame 47 so as to contact the periphery of the seed stripping drum 14. The frame 47 is left substantially open between its central shaft 50 and the bats 48. In this way openings 54 are left between adjacent bats 48, which openings 54 extend inwardly toward the shaft 50. When the reel 16 is rotated, in the direction indicated, segments of the crop are trapped in the openings 54 between the bats 48 and are guided inwardly to contact the seed stripping drum 14. Since the openings 54 extend a substantial distance toward the reel shaft 50, a minimum of stems are broken by bending of the stems by the reel 16.

The reel 16 is rotated at a much slower speed than is the seed stripping drum 14. For instance, in grass seed crops the drum 14 may be rotated at about 520 rpm while the reel 16 might be rotated at about 46 rpm.

The preferred embodiment of the bats 48 is shown best in FIGS. 2 and 5. Each bat 48 consists of a transverse rib 56 fixed to three bolts 58. The bolts 58 attach the ribs 56 to the peripheries of the three discs 52. The rib 56 is generally V-shaped in cross-section as shown in FIG. 5. In the widened portion of each V-shaped rib 56 is fixed a generally U-shaped connector 60. The connector 60 holds a foam rubber wedge 62 along the length of the rib 56. The foam rubber wedge 62 is surrounded by a covering 64 of durable vinyl covered nylon. The bat 48 is thereby provided with a durable cushioned surface 66 with which to contact the periphery of the seed stripping drum 14. As the cushioned surface 66 moves over the surface of the seed stripping drum 14 it is compressed somewhat. This action is found to effectively hold the seed bearing portion of the crop against the seed stripping drum 14 without causing substantial damage, such as stem or seed breakage, to the crop. To adjust the amount by which bat surface 66 is compressed at the seed stripping drum 14, the shaft 50 of the reel 16 is mounted to the side plates 18 to allow for a small amount of generally vertical movement of the reel 16 relative to drum 14. The bearings (not shown) holding the shaft 50 to the side plates 18 are therefore mounted for generally vertical sliding movement on the side plates 18.

As shown in FIG. 2, the ribs 56 are mounted in a slanted arrangement on the rotating reel 16. This slant is achieved by both slanting and twisting the ribs 56 as they are bolted to the discs 52. The ribs 56 are so slanted and spaced on the reel periphery to ensure that a portion of a rib 56 is always in contact with the seed stripping drum 14 as the reel 16 is rotated. The leading edge of one rib 56 contacts the seed stripping drum 14 before the trailing edge of the preceding rib 56 rotates out of contact with the drum 14. If this slanted arrangement of the ribs were not used, the seed stripping drum 14 would slow down and speed up as each rib 56 engaged and disengaged itself from the drum 14.

As is evident from the drawings, the rotating reel 16 has a substantially larger diameter than does the seed stripping drum 14. Also, the rotating reel 16 is rotated at a much slower speed than is the seed stripping drum 14. While not being bound by the same, it is believed that the slower rotation speed of the reel 16 is made possible because the reel 16 is functioning primarily to guide the crop to, and hold it against, the seed stripping drum 14. The reel 16 is not believed to play an active part in stripping the seeds from the crop. The slower speed of rotation of the reel 16 reduces the amount of seed loss caused by impacting the seed heads by the reel 16.

The seed stripping drum 14 and the rotating reel 16 are driven in opposite directions and at different speeds by the drive mechanism 70 shown in FIG. 6. A main shaft 72 extends through one of the side plates 18. The main shaft 72 is driven by a hydraulic motor (not shown) powered by the swather unit 4. Two pulleys 74, 76 are fixed to rotate with the main shaft 72. The pulley 74 is used to drive a large pulley 78 through a belt 80 and an idler pulley 82. The shaft 50 of the rotating reel 16 is driven by the large pulley 78 as shown. Similarly, the pulley 76 is used to drive a small pulley 84 through an endless belt 86 and idler pulley 88. The central shaft 44 of the seed stripping drum 14 is driven by the small pulley 84 at a faster speed than is shaft 50. The drive mechanism 70 is closed in by a cover 90 hinged to the side plate 18.

The above-described preferred embodiment of the seed stripping drum 14 and rotating reel 16 has been found to achieve seed stripping from grasses without forcing the grass stems to bend sharply rearwardly over an advancing platform. The sharp rearward bending of grass stems was felt to cause significant amounts of stem breakage. It is therefore believed that the present invention reduces this problem.

The header assembly 2 of the present invention can be used with seed separators other than the improved seed separator 3 to be described hereinafter. Such known seed separators as screen-type, cyclone-type, inertia-type, bag-type, gravity setting-type, and impingement-type separators may be used.

THE SEED SEPARATOR

The seed separator 3 includes a duct 100 having an inlet end 102 and an outlet end 104. The inlet end 102 is connected to the header assembly 2 such that the duct 100 communicates with the transverse inlet 28 of the header assembly 2. A blower 106 is provided at the outlet end 104 of the duct 100 so as to draw an air stream carrying seeds from the header assembly 2 through the inlet end 102 and through the duct 100.

Figure 3A:
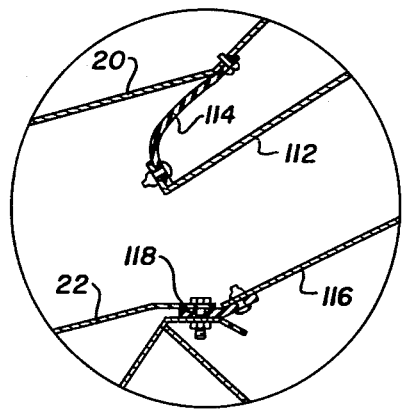
FIGS. 3a and 3b show exploded sectional views of the hinge connections.

To accommodate the vertical pivoting movement of the header assembly 2, the seed separator 3 includes a hinged duct section 108 at its inlet end 102. This duct section 108 extends forwardly from the swather unit 4, between the upper and lower lift arms 9, 10 of the swather unit. The lift arms 9, 10 prevent the hinged duct section 108 from falling from the swather unit 4 as will be explained. The hinged duct section 108 is shown in detail in FIG. 3. The hinged duct section 108 is connected at its lower end 109 to the header assembly 2. The upper end 109a of the hinged duct section 108 rests on, but is not connected to, a fixed duct section 110 of the duct 100. The upper plate 112 of the hinged duct section 108 is connected to the upper box section 20 of the header assembly 2 through a flexible rubber seal 114. The lower end 109 of the hinged duct section 108 extends the width of the header assembly 2 so as to communicate with the transverse inlet 28. The seal 114 therefore extends the width of the hinged duct section 108 to seal this duct section 108 to the header assembly 2. The lower plate 116 of the hinged duct section 108 is connected to the lower box section 22, for movement therewith, through a rubber strip 118, as shown in FIG. 3a.

Figure 3B:
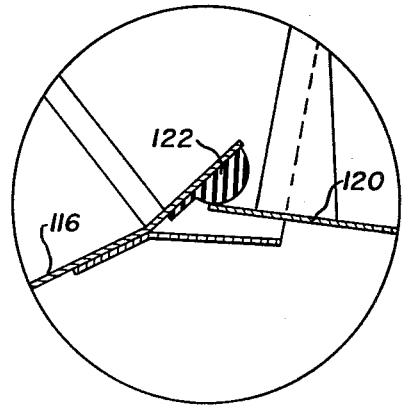

At the upper end 109a of the hinged duct section 108, the lower plate 116 of duct section 108 rests on the lower plate 120 of the fixed duct section 110 as shown in FIG. 3b. A rubber lip 122 is connected to the lower plate 116 as shown to seal the hinged duct section 108 while allowing it to pivot relative to the stationary duct section 110.

At the upper end 109a of the hinged duct section 108 a gap 124 is formed between the duct section 108 and the fixed duct section 110 as the hinged duct section pivots with the header assembly 2. To close this gap 124, a flap 126 is hinged to the upper plate 128 of the fixed duct section 110. The flap 126 slides over the upper plate 112 of the hinged duct section 108 to seal that duct section 108 as it is pivoted.

A pair of side sealing plates 130 is connected on either side of the fixed duct section 110 to close the gap which forms at the sides of this duct section 110 as the hinged duct section 108 is pivoted.

In FIG. 7, the hinged duct section 108 and the fixed duct section 110 are shown in a top plan view. The top plates 112 and 128 of these sections are removed. The hinged duct section 108 is shown to narrow in width toward the fixed duct section 110. It is desirable to keep the cross-sectional area of both the hinged duct section 108 and the fixed duct section 110 substantially equal along their lengths so as not to alter the speed of the air stream carrying the seeds. For this reason both duct sections 108 and 110 increase in depth as their widths are decreased.

A pair of air and seed directing baffles 132 are provided in the hinged duct section 108 as shown in FIG. 7. The baffles 132 evenly distribute the air suction along the entire width of the duct inlet 102. Without the baffles 132, the blower 106 would tend to pull harder on the central portion of the seed stripping drum 14 than on the ends of the drum 14.

The duct 100 is curved between the outlet end 104 and the fixed duct section 110 to form a curved duct section 134. The curved duct section 134 is defined by an inner wall 136, an outer wall 138 and two side walls (not shown in the cross-sectional views). As shown in FIG. 1, the curved duct section 134 turns through 180°. This curve has been found to be sufficient to cause the air stream carrying the seeds to throw the seeds outwardly, by centrifugal force, toward the outer wall 138 as the air stream rounds the curve.

The curved duct section 134 increases in cross-sectional area toward the outlet end 104 of the duct 100 so as to slow down the air stream and allow the seeds to fall out somewhat from the air. While this provision is not felt to be essential to the seed-air separation operation taking place in the curved duct section 134, it is believed to enhance the separation.

A plurality of baffles 140 are connected to the side walls of the curved duct section 134 extending across the width of that duct section 134. The baffles 140 divide the curved duct section 134 into a seed chamber 142 adjacent the outer wall 138, and an air chamber 144 adjacent the inner wall 136. The baffles are equally spaced and are inclined as shown so as to deflect the seeds impinging thereon outwardly toward the outer wall 138. The baffle spacing and inclination allows the air to pass from the seed chamber 142 to the air chamber 144 toward the blower 106. The baffles 140 are arranged on a curve generally following the curve of the curved duct section 134. The baffles 140 are also arranged so as to decrease the cross-sectional area of the seed chamber 142 toward the top of the curved duct section 134 as shown. This arrangement forces a large portion of the air stream carrying the seeds to escape to the air chamber 144 and out through the blower 106.

The seeds are therefore in a concentrated stream at the top of the curved duct section 134 along the outer wall 138.

A seed withdrawal duct 146 is provided in the outer wall 138 at the top of the curved duct section 134. The duct 146 communicates with the seed chamber 142 in order to withdraw the seeds therefrom. The seed withdrawal duct 146 turns through 180°, as shown, and has an increasing cross-sectional area in the direction of the seed travel. These provisions slow the air down somewhat.

A sealed container 148 is connected to the seed withdrawal duct 146 for collecting the seeds. A tube 150 is connected between the container 148 and the inlet side of the blower 106 for drawing an air stream through the container 148 and the seed withdrawal duct 146. This air stream thereby carries the seeds from the seed chamber 142 to the container 148.

As mentioned above, the air and seeds are slowed down in the seed withdrawal duct 146 before they enter the container 148. This provision reduces the turbulence of the air as it enters the container 148. To further reduce turbulence in the container 148, a seed deflecting baffle 152 is fixed in the container 148 communicating with the seed withdrawal duct 146. The baffle 152 functions to deflect the seeds toward the side wall 153 of the container 148, away from the tube 150. The container 148 is large, to allow the seeds to fall out from the air stream carrying them. This further reduces turbulence in the container 148.

The container 148 is connected at its base to a bottom-feeding auger 154 for unloading the seeds from the container 148. The auger 154 is effectively sealed at both its ends to prevent air from being drawn into the sealed container 148. A removable clean-out plate 156 closes the lower end of the auger 154. A collapsible tube 158, formed from vinyl covered nylon, closes the upper end of the auger 154 against inward air movement, while allowing the seeds to be discharged from the auger 154.

The seed separator 3, as described above, achieves seed-air separation in two steps. A portion of the seed-air separation takes place in the curved duct section 134, while the remainder of the separation takes place in the container 148. The single blower 106 is used to draw the air streams carrying the seeds through both of these seed-air separation operations. It is conceivable that two blowers could be used, one drawing on the curved duct section 134 and the other drawing on the container 148. In this case, the blowers should be balanced to adjust the air flows within the curved duct section 134 and the container 148 as varying degrees of blocking at the seed stripping drum 14 alter the vacuum at the duct inlet 102. Blocking of the seed stripping drum 14 can occur when a heavy crop segment is held against the seed stripping drum 14. If this balancing precaution were not taken, one blower might draw harder than the other so as to upset the seed-air separation operations. By using the single blower 106 the air flows in the curved duct section 134 and the container 148 are inherently balanced.

While the present invention has been described in connection with the preferred embodiments thereof, it should be understood that there may be other embodiments which fall within the spirit and scope of the invention as defined by the following claims.

The embodiments of the invention in which an exclusive property or privilege is claimed are defined as follows:

1. A header assembly for stripping seeds from the seed heads of a standing crop, whereby the seeds may then be drawn into a seed separating and collection assembly, comprising:
    a frame assembly forming a forwardly opening inlet means for connection with the seed separating and collection assembly;
    a drum assembly mounted in the frame assembly immediately forward of the inlet means, said drum assembly comprising longitudinally spaced apart, upstanding support members and a plurality of elongate members forming stripping edges and extending longitudinally between the support members and being attached circumferentially thereto, said drum assembly being arranged to be rotated so that its forward end is moving upwardly at a relatively high rate of speed about a substantially horizontal axis;
    a cylindrical reel mounted in the frame assembly with its longitudinal axis above and parallel to the corresponding axis of the drum assembly, said reel being arranged to be rotated so that its forward end is moving downwardly at a relatively low rate of speed, said reel comprising spaced apart, upstanding support means and a plurality of elongate batts extending longitudinally between the support means and being attached circumferentially thereto, whereby said support means and batts form openings therebetween which extend inwardly toward the axis of the reel so that, when the reel is partly submerged in the crop and is rotated, a segment of crop is trapped between a pair of batts and is deflected by one of the batts into contact with the stripping edges of the drum assembly;
    each said batt having a broad cushioned working surface arranged to substantially tangentially contact and compress, substantially across the width of said working surface, against the stripping edges of the drum assembly in the course of a rotation about the axis of the reel, to thereby positively hold substantially all the seed heads, which have been deflected, against said stripping edges to cause seeds to be stripped therefrom.

2. The header assembly as set forth in claim 1 wherein:
    the spacing and extent of advancement of one end of a batt relative to the other end is such that the leading end of one batt contacts the stripping means before the trailing end of the preceding batt rotates out of contact with the stripping means.

3. A seed harvester for stripping and recovering seeds from the seed heads of a standing crop, comprising:
    a frame assembly forming a forwardly opening inlet means for connection with a seed separating and collection assembly;
    a drum assembly mounted in the frame assembly immediately forward of the inlet means, said drum assembly comprising longitudinally spaced apart, upstanding support members and a plurality of elongate members forming stripping edges and extending longitudinally between the support members and being attached circumferentially thereto, said drum assembly being arranged to be rotated so that its forward end is moving upwardly at a relatively high rate of speed about a substantially horizontal axis;

a cylindrical reel mounted in the frame assembly with its longitudinal axis above and parallel to the corresponding axis of the drum assembly, said reel being arranged to be rotated so that its forward end is moving downwardly at a relatively low rate of speed, said reel comprising spaced apart, upstanding support means and a plurality of elongate batts extending longitudinally between the support means and being attached circumferentially thereto, whereby said support means and batts form openings therebetween which extend inwardly toward the axis of the reel so that, when the reel is partly submerged in the crop and is rotated, a segment of crop is trapped between a pair of batts and is deflected by one of the batts into contact with the stripping edges of the drum assembly;

each said batt having a broad cushioned working surface arranged to substantially tangentially contact and compress, substantially across the width of said working surface, against the stripping edges of the drum assembly in the course of a rotation about the axis of the reel, to thereby positively hold substantially all the seed heads, which have been deflected, against said stripping edges to cause seeds to be stripped therefrom;

a duct having an inlet end and an outlet end, the inlet end being connected to the inlet means of the frame assembly;

first pneumatic means at the outlet end for drawing the air stream carrying seeds into the inlet end and through the duct;

the duct being curved between the inlet and outlet ends to form a curved duct section defined by an inner and an outer wall and two side walls, said duct having an increasing cross-section from its inlet to its outlet ends, the curve being sufficient to cause the seeds in the air stream to be moved outwardly by centrifugal action toward the outer wall;

means extending transversely across the curved duct section between the side walls and dividing the curved duct section longitudinally into a seed chamber adjacent the outer wall and an air chamber adjacent the inner wall, said means comprising a plurality of baffles fixed in spaced apart sequence to the side walls, said baffles being arranged on a curve generally following the curve of the duct section but decreasing the cross-sectional area of the seed chamber near its outlet end while increasing the area of the air chamber near its outlet end, said baffles being arranged so as to deflect seeds impinging thereon outwardly toward the outer wall while allowing air to pass from the seed chamber to the air chamber toward the outlet end of the duct;

said first pneumatic means communicating with the air chamber;

a seed withdrawal duct communicating with the seed chamber for withdrawing seeds from the seed chamber of the curved duct section;

sealed container means connected to the seed withdrawal duct for collecting the seeds;

second pneumatic means connected to the container means for drawing an air stream through the container means and the seed withdrawal duct to thereby carry the seeds into the container means; and the container means being of a sufficient size to allow the seeds to fall out of the air stream carrying them, whereby a portion of the seed-air separation operation takes place in the curved duct section while the remaining seed-air separation operation takes place in the container means.

4. A seed separator for separating seeds from an air stream carrying seeds, comprising:

a duct of expanding cross-section having an inlet end and an outlet end;

first pneumatic means at the outlet end for drawing the air stream carrying seeds into the inlet end and through the duct;

the duct being curved between the inlet and outlet ends to form a curved duct section defined by an inner and an outer wall and two side walls, the curve being sufficient to cause the seeds in the air stream to be moved outwardly by centrifugal action toward the outer wall;

means extending transversely across the curved duct section between the side walls and dividing the curved duct section longitudinally into a seed chamber adjacent the outer wall and an air chamber adjacent the inner wall, said means comprising a plurality of baffles fixed in spaced apart sequence to the side walls, said baffles being arranged on a curve generally following the curve of the duct section but decreasing the cross-sectional area of the seed chamber near its outlet end while increasing the area of the air chamber near its outlet end, said baffles being arranged so as to deflect seeds impinging thereon outwardly toward the outer wall while allowing air to pass from the seed chamber to the air chamber toward the outlet end of the duct;

said first pneumatic means communicating with the air chamber;

a seed withdrawal duct communicating with the seed chamber for withdrawing seeds from the seed chamber of the curved duct section;

sealed container means connected to the seed withdrawal duct for collecting the seeds;

second pneumatic means connected to the container means for drawing an air stream through the container means and the seed withdrawal duct to thereby carry the seeds into the container means; and the container means being of a sufficient size to allow the seeds to fall out of the air stream carrying them, whereby a portion of the seed-air separation operation takes place in the curved duct section while the remaining seed-air separation operation takes place in the container means.

* * * * *